Figure 1:
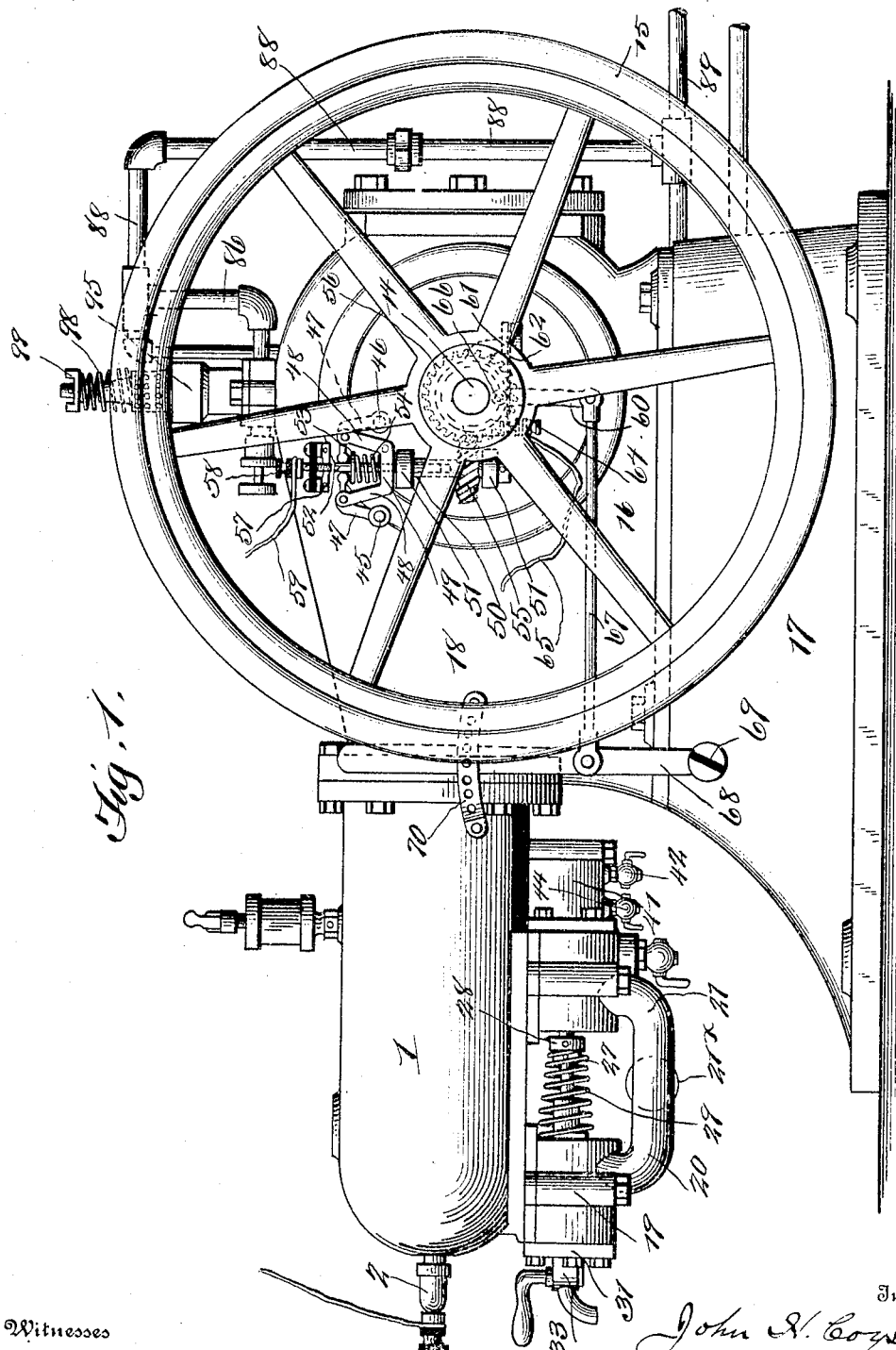

No. 892,501. PATENTED JULY 7, 1908.
J. H. COGSWELL.
INTERNAL COMBUSTION ENGINE.
APPLICATION FILED JULY 2, 1907.

4 SHEETS—SHEET 1.

Witnesses

Inventor
John H. Cogswell
By
Attorney

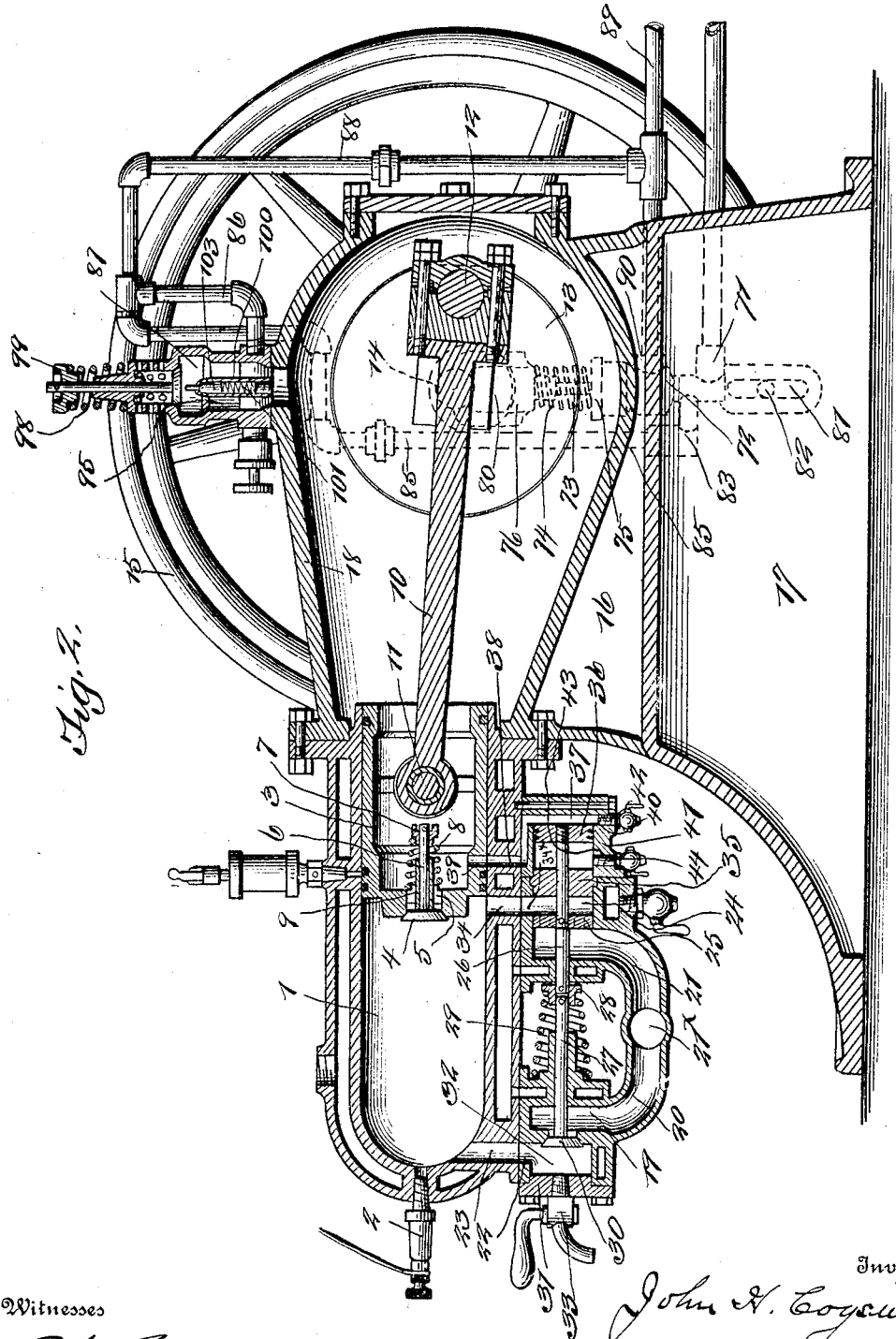

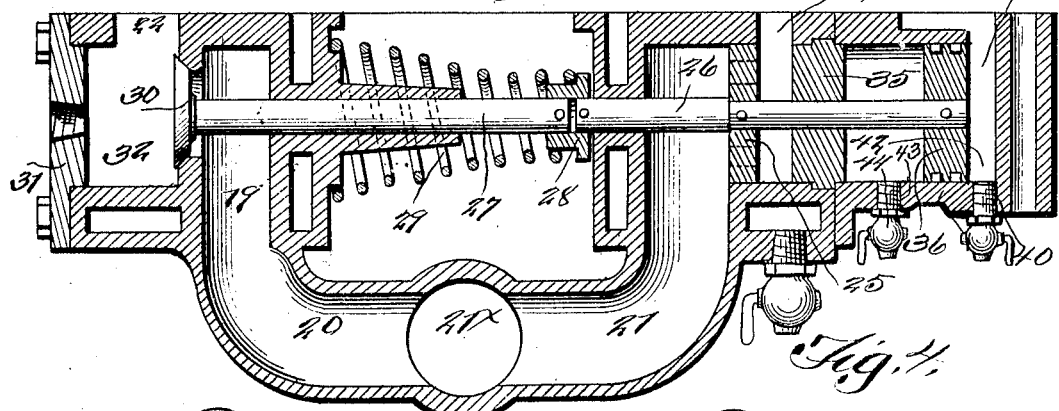

No. 892,501. PATENTED JULY 7, 1908.
J. H. COGSWELL.
INTERNAL COMBUSTION ENGINE.
APPLICATION FILED JULY 2, 1907.
4 SHEETS—SHEET 4.
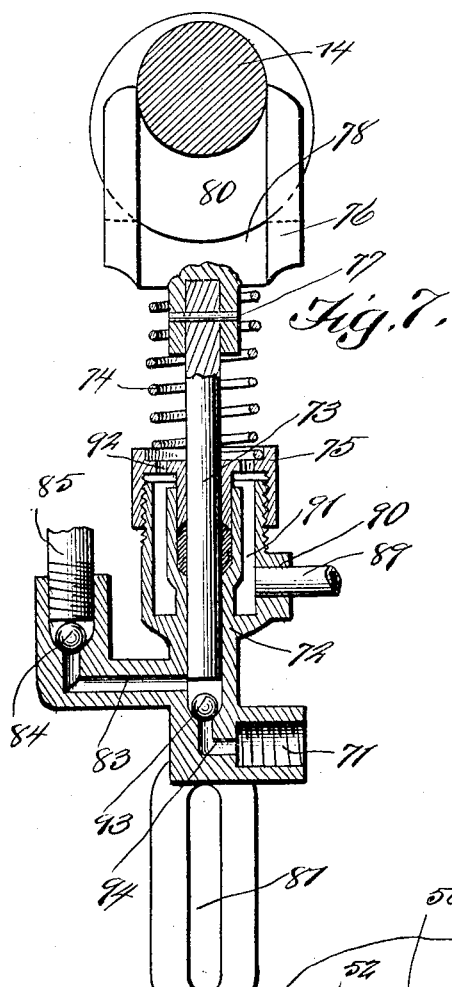
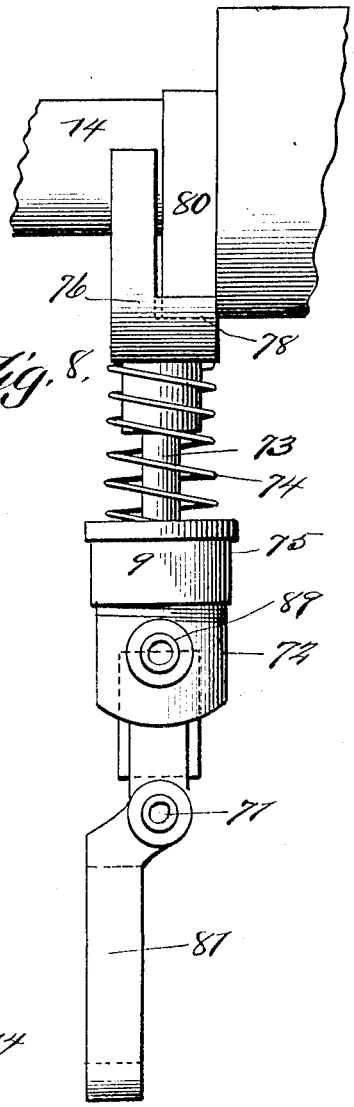
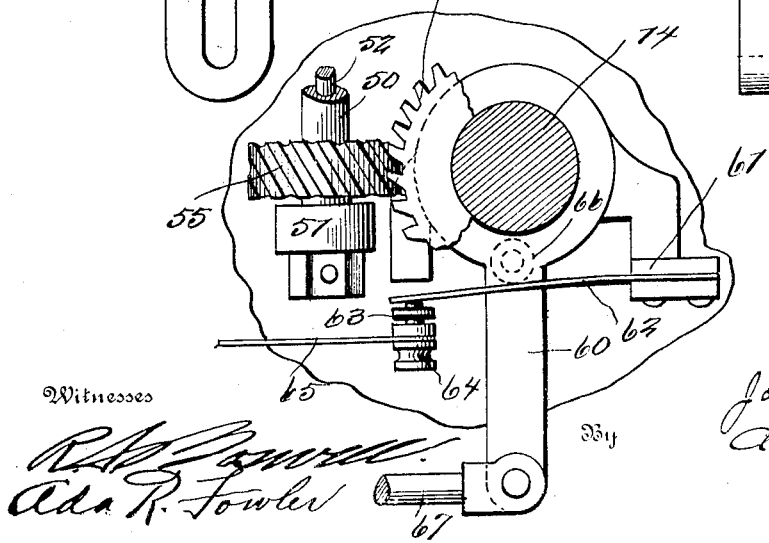
Inventor
John H. Cogswell
Witnesses
Attorney

UNITED STATES PATENT OFFICE.

JOHN HENRY COGSWELL, OF HAVANA, ILLINOIS.

INTERNAL-COMBUSTION ENGINE.

No. 892,501. Specification of Letters Patent. Patented July 7, 1908.

Application filed July 2, 1907. Serial No. 381,879.

*To all whom it may concern:*

Be it known that I, JOHN H. COGSWELL, a citizen of the United States, residing at Havana, in the county of Mason and State of Illinois, have invented certain new and useful Improvements in Internal-Combustion Engines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in internal combustion engines and the object of the invention is to produce a simple and efficient apparatus of this nature in which the products of combustion may be quickly expelled from the cylinder after the charge is ignited and force expended, thereby leaving a full capacity of the cylinder for the reception of a new charge.

The invention consists further in various details of construction and combinations and arrangements of parts which will be hereinafter fully described and then specifically defined in the appended claims.

I illustrate my invention in the accompanying drawings, in which:—

Figure 1 is a side elevation of my improved engine. Fig. 2 is a vertical central sectional view through the apparatus. Fig. 3 is a detailed section longitudinally through the portion of the engine comprising the means for allowing the products of combustion to readily exhaust from the cylinder. Fig. 4 is a top plan view of the form shown in Fig. 3. Fig. 5 is a sectional view through the mixer. Fig. 6 is a bottom plan view of the details shown in Fig. 5. Fig. 7 is a sectional view through the means for forcing the gasolene to the separator. Fig. 8 is a side elevation of the details shown in Fig. 7, and Fig. 9 is a detail in elevation.

Reference now being had to the details of the drawings by numeral, 1 designates a cylinder having a suitable water jacket and 2 designates a sparking plug fitted in one end thereof. 3 designates a suitably packed piston working within said cylinder and is provided with a valve 4 adapted to seat against a margin of and close an aperture 5 formed in said piston.

6 designates a valve stem having a suitable button 7 fixed thereon and which serves as an abutment to the spring 8 bearing between said button and the end of the piston about the boss 9 through which said stem is guided. The office of said spring, it will be understood, is to normally hold the valve seated.

10 designates a pitman which is pivotally connected to a pin 11 carried by the piston. Said pitman is pivotally connected to a crank pin 12 on the disk 13, which latter is keyed to crank blocks of shaft 14. Two fly or balance wheels 15 are fixed to said shaft, only one of which wheels, however, is shown in the drawings, two being provided in order to steady and balance the engine. Said shaft is mounted in suitable bearings upon the bed 16, which latter is supported upon a sub-base 17, thereby giving a good substantial foundation to the engine. Fixed to the flanges of the cylinder 1 is a compression crank chamber 18 in which said disk and pitman are mounted and adapted to contain the mixed fuel in readiness to be introduced, at predetermined moments, into the cylinder to be compressed prior to being fired. Fixed to said cylinder at any suitable location, as upon the under side thereof, is a casting 19 having exhaust ducts 20 and 21, the latter of which is adapted to communicate through a port 22 with a port 23 which leads from one end of the combustion chamber of the cylinder, while the other duct 20 is adapted to communicate with the chamber 24 in which the piston 25 is mounted. Piston stems 26 and 27 are mounted to reciprocate in suitable bearings within said casting 19 and the inner ends of said pistons 26 and 27 are connected by means of pins to a button 28, which latter also serves as an abutment for the spring 29 which bears at one end against a partition wall within said casting. A valve 30 is fixed to the stem 27 and is adapted to be held normally seated by action of the spring 29, thereby closing communication between the ports 21 and 22. A plate 31 forms a closure to a chamber 32 formed in said casting said chamber communicating with the ducts 22 and 21, and 33 designates a cock which is fitted in a threaded aperture in said plate, thereby forming means whereby the contents of the chamber 32 may make exit if desired. A suitable water jacket is also provided for portions of the casting in which the valve mechanism described is positioned in order to prevent the parts from becoming unnecessarily highly heated. The piston 25 which is fixed to the stem 26 is adapted to be actuated by the pressure upon the products of combustion in order to impart a longitudinal movement to the piston stems 26 and 27 when the port 34 through the cylinder comes into registration with the port 34×, which leads through into the chamber 24. A suitable division head 35 is mounted within the chamber 24 and has a central aperture adapted to receive and guide the piston rod 26, and 36 designates a second piston having packing rings mounted in the circumference thereof and fitting snugly against the walls of said chamber. A suitable duct 37 leads to and communicates with a port 38 which is adapted, when the piston 3 approaches its farthest outward limit, to register with a port 39 formed in the wall of the piston 3. A port 40 leads through the casting 41, which is secured to the casting 19 in any suitable manner, and an air cock 42 is adapted to regulate the passage of air through said port 40.

43 designates an aperture, the walls of which are threaded and adapted to receive an air cock 44.

Referring to Fig. 1 of the drawings will be seen a governing mechanism of the vertical type having two weights 45 and 46 fixed to the arms 47, which are pivotally connected to the arms 48 of the yoke 49. 50 designates a shaft which extends down through a suitable bearing 51, which shaft is hollow and is adapted to receive the stem 52 having a fixed collar 53 thereon against which the inner free ends of the arms 47 are adapted to contact. 54 designates a spring which is mounted intermediate said collar 53 and the yoke and serves to normally hold the stem 52 at its highest limit. Fixed to said shaft 50 is a spiral gear 55, which is in mesh with a spiral gear wheel 56 fixed to the motor shaft 14, whereby speed may be transmitted to the governor. Said spring normally holds the weights until the centrifugal force throws the latter in such a manner as to cause the stem 52 to be moved downward under the tension of the spring bearing against the fixed collar thereon. A fixed insulated plate 57 is mounted adjacent to the upper end of the stem 52 and carries a binding post 58 to which a wire 59 is adapted to be connected. When the engine is running at a normal speed, the binding post carried by said plate will be in contact with the stem 52 but, when the speed of the engine is accelerated, the governor will cause the stem to withdraw from the binding post and break the circuit. By screwing the binding post down, the speed of the motor may be increased or, by moving the binding post in the opposite direction, the speed may be decreased, by which construction a simple and reliable governor is afforded.

Referring to Fig. 1 of the drawings will be seen a timing lever designated by 60, said lever being fixed to the side of the crank-bearing in order to have a rotating movement. This timing lever comprises a collar with a lever extending below, and upon said collar is an ear 61 which is split, and 62 designates a flat spring held by the ear on the collar and extending over to the opposite side of the collar where there is a similar extension having an insulated plate 63 to which a suitably insulated binding post 64 is connected having a wire 65 connected thereto and, when the said spring 62 is pressed against the binding post by means of the roller 66 which is set upon the hub of the fly wheel, the contact is made by moving the spring until it comes in contact with the binding post 64, which closes the circuit for a period during one-tenth of a revolution of the fly wheel. If the governing circuit is closed, a spark will result through the sparking plug. A connecting bar 67 is pivotally fastened to the timing lever 60 and in turn is pivotally connected to the lever 68, which latter is mounted upon a pivot pin 69 upon the base of the engine. Said lever 68 may be held in different positions by means of a pin or lever mechanism engaging the same and also the segment member 70, which is provided with a series of apertures and is fastened to the cylinder, as shown clearly in Fig. 1 of the drawings. By means of the lever 68, the time of sparking may be advanced by throwing the lever forward and, by moving the lever in the opposite direction, the sparking may be retarded, thereby forming an efficient and simple means for regulating this part of the apparatus.

Referring to Figs. 7 and 8 of the drawings, it will be seen means for forcing the gasolene to the mixing chamber consists of the pipe 71 from which the gasolene may be drawn through from any suitable supply tank. Mounted within the casing 72 forming the cylinder of the pumping apparatus is a stem 73, said stem acting as a plunger and works in a suitably packed gland in a bearing forming a portion of the casing 72, and a spring 74 bears between the top of the threaded cap or plug 75, which fits over the casing 72 and also the forked head 76, which is fastened by means of a pin 77 to the plunger 73. The arms of said head extend one upon either side of the shaft 14 and serve to guide the head in its reciprocating movement. A shoulder 78 formed integral with said head and shown clearly in Fig. 8 of the drawings is concaved to receive the eccentric 80 which is fixed to the main shaft 14, whereby at each revolution of the shaft a longitudinal movement may be imparted to the plunger 73, the latter being returned to its starting position by the action of the spring 74. The lower portion of the casing 72 is provided with an elongated slot 81 through which a bolt 82 may be passed, as shown in Fig. 2 of the drawings, for the purpose of mounting the apparatus in an upright position upon the base 17. Branching from the lower portion of the casing 72 is a pipe 83 having a suitable valve 84 and a pipe 85, shown in Fig. 2 of the drawings, leads from the branching pipe 83 and is adapted to communicate through the pipe 86 with the interior of the mixing chamber 87. A pipe 88 also communicates with the pipes 85 and 86 and with the pipe 89, which latter leads to and communicates with a port 90 which forms an exit to the cup-shaped chamber 91 which surrounds a part of the cylindrical portion of the casing 72 in which the plunger 73 works. Said chamber 91 is provided for the purpose of catching any over-flowing gasolene which may leak from about the plunger 73 and forming means whereby such gasolene may return through the pipe 89. Said plug 75, it will be noted, is provided with vent apertures 92 in order that the gasolene may run back through the pipe 89 without hindrance due to suction. A suitable valve 93 is positioned over the upper end of the angled port 94, which is formed in the casing 72 and serves as means for preventing any gasolene which may have been drawn by the plunger above, the valve 93, being forced back into the pipe 71 upon the downward throw of the plunger 73.

Referring to Figs. 2 and 5 of the drawings, 95 designates a mixing chamber having a series of perforations 96 formed in the walls thereof, and 97 designates a valve stem which is normally held seated by means of the spring 98 which bears between a shoulder formed upon the mixing chamber and a button 99 which is fixed to the end of the stem 97. Supported by the walls of the chamber portion of the casing 95 is a shell 100 within which a coiled spring 101 is mounted, the lower end of said shell being closed by the plug 102 against which the spring 101 bears and 103 designates a conical-shaped plug having grooves 104 longitudinally formed in the circumference thereof and 105 is a stem which projects from the upper end of the plug 103 and its upper end is positioned a short distance below the valve 106, which latter is adapted to be depressed against the stem 105 for the purpose of allowing the gasolene to make exit over the surface of the shell 100 to be caught up by the inrushing air, as it is drawn by the impulses of the engine, through the various perforations of the mixing chamber. 107 designates a needle valve mounted in a suitably packed gland and adapted to regulate the admission of the gasolene through the pipe 86 into the interior of the shell 100.

In operation, a quantity of gasolene mixed with air is first drawn into the chamber 18 by imparting several revolutions to the operating shaft. Each time the piston 25 is driven in to the cylinder, suction is formed in the chamber 18, which causes the intake valve 106 to unseat, allowing the air and gasolene to enter the chamber 18. A suitable pressure of several pounds is maintained upon the gas within the chamber 18 and, upon the outer throw of the piston 3, a suction being formed in advance of the piston, the valve 4 will unseat and allow a charge of gasolene to enter the cylinder. The next forward throw of the piston will compress the charge and, at a predetermined moment, a sparking is effected for the purpose of exploding the charge. As the piston 3 is driven outward under the impact of the explosion, when the port 34 begins to register with the port $34^\times$ leading to the chamber 24, the piston 25 will be moved and also the stems 26 and 27, so that the port $34^\times$ will register with the port 20 and the valve 30 will be unseated, allowing the port 23 to be in communication with the port 21 and the two ports will thus form a sufficient means for allowing the cylinder to be thoroughly exhausted, the products of combustion issuing from the port 20 being discharged through the opening $21^\times$. As the piston stems 26 and 27 are moved longitudinally during the exhausting of the cylinder, the piston 36 moving with the piston stem 26 will draw air into the chamber 37 through the port 42 and, after the products of the combustion in the cylinder have nearly exhausted, the spring 29 will cause the piston stems 26 and 27 to return toward their normal positions and the piston 36 will compress the air in advance of the same and hold the valve 30 from seating until the port 39 in the piston 3 begins to register with the port 38, after which the air, which is compressed in advance of the piston 36, will be relieved and the valve 30 and the piston 25 will close the entrance into the passageways 20 and 21. After the cylinder has been thoroughly exhausted in the manner described, the pressure upon the mixed fuel within the crank chamber being in excess of the pressure upon the valve 4 will cause the latter to unseat and allow a new charge of fuel to enter the cylinder, preparatory to its being compressed by the next inner thrust of the piston. When the feed of the engine becomes accelerated, the governing mechanism will cause the piston 52 to be depressed under the tension of the spring bearing against the same and the circuit with the sparking plug will be open, therefore shutting off the firing of the charges which will have a tendency to cause the speed of the engine to be reduced. By the provision of the timing mechanism, illustrated in Fig. 1 of the drawings, the sparking of the charge may be regulated, the throwing forward of the lever 68 causing the advancing of the sparking, while the movement of the lever in the opposite direction will retard the same. By the rotary movement of the operating shaft, a supply of gasolene is fed through the pipes to the mixing chamber when it issues through the needle regulated port into the interior of the mixing chamber. As the intake valve 106 unseats under the impulses of the engine, the plug 103 will be depressed allowing the gasolene to overflow the shell in which said plug is contained and the air rushing over the surface of the shell will catch up the gasolene and cause the same to be thoroughly mixed therewith as it enters the crank chamber.

From the foregoing, it will be noted that, by the construction of an engine embodying the features of my invention, means is afforded for thoroughly exhausting the cylinder so that the entire capacity of the combustion chamber may receive the new charge, the exhausting of the cylinder being accomplished by the plurality of ports which are controlled by the mechanism which is acted upon by the pressure upon the products of combustion.

By the provision of the gasolene supplying means and the mixer, a supply of gaseous fuel will be constantly maintained within the crank chamber and the engine prevented from attaining an excessive speed by the automatic shutting off of the sparking.

What I claim as new is:—

1. An internal combustion engine comprising a cylinder and crank chamber, a valved-working piston mounted within the cylinder and through which communication is afforded between the cylinder and chamber, means for supplying a gaseous fuel to said chamber, a shaft driven by the piston, sparking means, a casing fixed to said cylinder and having exhaust passageways leading to the combustion chamber of the cylinder, a piston mounted in a chambered portion of the casing and adapted to normally close one of the exhaust passageways in the casing, a stem upon which said valve in the casing is mounted, a valve adapted to regulate one of the exhaust passageways communicating with the combustion chamber, a second piston secured to said stem and adapted to compress air in advance thereof to hold said valve from seating until the cylinder is thoroughly exhausted, as set forth.

2. An internal combustion engine comprising a cylinder and crank chamber, a valved-working piston mounted within the cylinder and through which communication is afforded between the cylinder and chamber, means for supplying a gaseous fuel to said chamber, a shaft driven by the piston, sparking means, a casing fixed to said cylinder and having exhaust passageways leading to the combustion chamber of the cylinder, a portion of said casing having a cylindrical chamber, a piston stem mounted in suitable bearings in said casing, a plurality of pistons secured to said stem, one of which pistons is adapted to control the communication through one of the exhaust passageways from the cylinder, a valve regulating another passageway leading from the end of the cylinder, and a stem to the latter valve connected to said piston stem, as set forth.

3. An internal combustion engine comprising a cylinder and crank chamber, a valved-working piston mounted within the cylinder and through which communication is afforded between the cylinder and chamber, means for supplying gaseous fuel to said chamber, a shaft driven by the piston, sparking means, a casing fixed to said cylinder and having exhaust passageways leading to the combustion chamber of the cylinder, a portion of said casing having a cylindrical chamber, a piston stem mounted in suitable bearings in said casing, a plurality of pistons secured to said stem, one of which pistons is adapted to control the communication through one of the exhaust passageways from the cylinder, a valve regulating another passageway leading from the end of the cylinder, a stem to the latter valve connected to said piston stem, said casing having a duct with an air cock leading thereto, through which air is drawn as the engine exhausts, the air being compressed upon the return movement of the piston stem and relieved as the port registers with a port in the valve piston, as set forth.

In testimony whereof I hereunto affix my signature in presence of witnesses.

JOHN HENRY COGSWELL.

Witnesses:
C. M. HAVIGHORST,
F. W. HOLZGRAPE,
H. R. NORTRUP.